United States Patent [19]

Lewis et al.

[11] Patent Number: 5,359,329
[45] Date of Patent: Oct. 25, 1994

[54] JAMMER REFERENCE TARGET MEASUREMENT SYSTEM

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 247,578

[22] Filed: Mar. 18, 1981

[51] Int. Cl.⁵ .................... G01S 7/36; G01S 13/44
[52] U.S. Cl. .................... 342/17; 342/149; 342/383; 342/384
[58] Field of Search .......... 343/16 M, 55 W, 100 LE, 343/ 18 E; 342/149, 17, 379–384

[56] References Cited

U.S. PATENT DOCUMENTS

| | | | |
|---|---|---|---|
| 3,710,390 | 1/1973 | Kreinheder | 343/16 M |
| 3,838,423 | 9/1974 | DiMatteo . | |
| 3,947,848 | 3/1976 | Carnaham et al. . | |
| 4,010,469 | 3/1977 | Marcum . | |
| 4,042,927 | 8/1977 | Helms . | |
| 4,051,474 | 9/1977 | Mack et al. | 343/100 LE |
| 4,086,592 | 4/1978 | Lewis et al. | 343/100 LE |
| 4,213,130 | 7/1980 | Vaessen | 343/16 M |
| 4,214,244 | 7/1980 | McKay et al. | 343/18 E |

*Primary Examiner*—Gilberto Barron, Jr.
*Attorney, Agent, or Firm*—Thomas E. McDonnell

[57] ABSTRACT

A system for cancelling jammer signals entering the mainlobe of a monopulse radar and providing target locations with respect to the jammer position comprising for a sequential lobing embodiment: measuring the angular position of the jammer in the radar's mainlobe via the use of monopulse sum and difference signals, pointing the radar antenna so that the jammer is positioned within the 3 dB points of the mainlobe of the monopulse antenna, converting the sum and difference echo signals received with the antenna in this position from the next radar transmission into a second set sum and difference signals, applying this second set of sum and second set of difference signals to the inputs of an adaptive canceller to cancel the jamming signal therein and storing these signals in time sequential order, changing the orientation of the radar antenna by a small arbitrary elevation angle, converting the sum and difference echo signals received with the antenna in this new position from a third radar transmission into a third set of sum and difference signals, applying this third set of sum signals and third set of difference signals in reverse order relative to the second set of signals to the inputs of an adaptive canceller to cancel the jamming signal therein, reading out the adaptively cancelled stored echo signals from the second radar transmission into one input of a divider in time coincidence with the application of the adaptively cancelled echo signals from the same targets from the third radar transmission to the other input of the divider to obtain ratio signals proportional to the elevation angle separating the individual targets from the jammer.

28 Claims, 4 Drawing Sheets

JAMMER REFERENCE TARGET MEASUREMENT SYSTEM

BACKGROUND OF THE INVENTION

The present invention relates generally to counter-counter measure devices, and more particularly, to a jammer cancelling circuit which references targets to the jammer location.

Monopulse radar circuits are frequently used in surveillance systems and in range and angle tracking systems. Such monopulse systems generally are adapted to simultaneously emit microwave energy in four offset, but overlapping, adjacent antenna lobe patterns. Each of these lobe patterns is arranged for the irradiation of a respective spacial quadrant located about the boresight or target tracking axis of the radar. The RF signals received from these four adjacent lobe patterns are combined to form a series of sum and difference signals. The sum and difference signals are then multiplied in a phase sensitive detector to obtain both magnitude and angular error information in three coordinates. This information is then utilized to generate three control voltage for positioning the elevation, azimuth and range tracking servos.

Pulse radars in general, and monopulse radars in particular, are vulnerable to jamming due to their directional beam antenna patterns. Such jamming generally comprises the transmission of a signal in the form of a noise-modulated continuous wave which, when detected in the sidelobes of the directional beam antenna, causes an obliteration of the desired target indications.

The detection and the tracking of targets becomes especially difficult if the jammer shares the radar's mainlobe with the target-to-be-detected. Accordingly, various schemes have been developed in the prior art to eliminate the jamming signal from the radar mainlobe. Generally such schemes are implemented by utilizing a notch filter to place a notch in the radar mainlobe at the location of the jammer. However, the location of a notch in the radar mainlobe, as illustrated in FIG. 1, severely distorts the mainlobe pattern. Such a distorted mainlobe pattern prevents the accurate location of targets. This can be understood by noting that targets are generally detected by sweeping the mainlobe of the radar antenna across the target. Thus, the RF reflections from the target, in essence, trace out the mainlobe pattern of the antenna during the sweep. The target may then be located by bisecting this mainlobe target tracing. However, it can be seen that when a notch is located in the mainlobe of the radar antenna, then symmetry cannot be relied on to estimate the target location with any accuracy.

OBJECTS OF THE INVENTION

Accordingly, it is an object of the present invention to significantly increase the target detection accuracy of monopulse radars when their mainlobes have been notched to eliminate jamming signals.

It is a further object of the present invention to provide target locations with respect to the jammer location.

Other objects, advantages, and novel features of the present invention will become apparent from the detailed description of the invention, which follows the summary.

SUMMARY OF THE INVENTION

Briefly, the present invention comprises a method and means for cancelling signals from a jammer entering the mainlobe of the antenna of a monopulse radar and for providing target locations with respect to the location of the jammer. Two embodiments are disclosed herein for the present invention: a sequential lobing technique; and a single monopulse transmission technique. The sequential lobing technique comprises, in one embodiment, the steps of:

receiving a first set of echo jamming signals and determining the position of the jammer therefrom;

effectively orienting the boresight axis of the monopulse radar antenna to point so that the jammer is positioned within the 3 dB points of the antenna mainlobe;

receiving a second set of echo and jamming signals reflected from the next radar transmission after the orienting step;

adaptively cancelling the jammer signal from this second set of received echo and jamming signals;

storing this second set of adaptively cancelled echo signals in time sequential order;

effectively changing the orientation of the boresight axis of the monopulse radar antenna by a small arbitrary elevation angle such that the jammer is still located approximately within the 3 dB points of the new mainlobe orientation of the antenna;

receiving a third set of echo and jamming signals reflected from the next radar transmission after this orientation changing step;

adaptively cancelling the jamming signals from this third set of received echo and jamming signals;

reading-out the second set of stored adaptively cancelled echo signals in time coincidence with the occurrence of the adaptively cancelled echo signals in the third set reflected from the same targets;

dividing the adaptively cancelled echo signals in one of either the second or third sets, e.g., the second set, by the time coincident adaptively cancelled echos in the other of the second or third sets, e.g., the third set, to obtain a set of ratio signals which are proportional to the angles separating the individual targets from the jammer. This same technique is then used to measure the target location in azimuth with respect to the jammer.

Another embodiment of a system for providing target locations with respect to the location of the jammer in the mainlobe of a monopulse radar utilizing a single transmission comprises:

a monopulse radar including an antenna with two effective apertures for receiving echo signals from a radar transmission along with jamming signals;

means for determing the location of the jammer;

means for effectively pointing the boresight axis of the monopulse antenna so that the jammer is positioned within the 3 dB points of the mainlobe of the antenna;

first means for squinting the echo signals received from the two effective apertures of the monopulse antenna for a first angle of arrival;

means for adding the echo signals from each of the two effective antenna apertures;

second means for squinting the echo signals from the two effective apertures of the monopulse antenna for a second angle of arrival;

wherein the first and second angles of arrival of the squinting means are small relative to the unsquinted mainlobe such that the jammer is still located approximately within the 3 dB points of the resulting squinted antenna mainlobe;

first adaptive cancelling means for cancelling the jamming signals from the received echo signals by utilizing the output signals from the adding means and the first squinting means in an adaptive cancelling process;

second adaptive cancelling means for cancelling the jamming signal from the received echo signals by utilizing the outputs from the adding means and the second squinting means in an adaptive cancelling process; and means for taking the ratio of the output signals from one of the adaptive cancelling means with respect to the output signal from the other of the adaptive cancelling means, the ratio signal obtained therefrom being proportional to the angles separating the individual targets from the jammer.

DETAILED DESCRIPTION OF THE PREFERRED EMBODIMENT

As noted above, the purpose of the present invention is to cancel signals from a jammer entering the mainlobe of a radar and to provide target locations with respect to this jammer location. The invention is intended for use with pulsed radar systems, and in particular, for use with monopulse radar systems requiring an anti-jamming capability. More specifically, the invention measures the angle position of a jammer in the monopulse mainlobe with respect to the radar antenna boresight axis utilizing conventional monopulse difference signals in a passive mode. The system then cancels the jamming signal and permits detection of targets not at the same location angles as the jammer. Finally, the system measures the angular location of these detected targets with respect to the location of the jammer.

The foregoing is effected through the discovery that by adaptively cancelling or notching the antenna response at the jammer location (with the jammer in the mainlobe of the antenna) and then shifting slightly the effective orientation of the antenna and notching the antenna response again at the position of the jammer location, the ratio of these two notched signals will yield a signal proportional to the elevation or azimuth angle separating the target from the jammer.

It should be understood before continuing, that although the present invention is being described for use with a monopulse radar system, it is not limited thereto, but may be utilized with any system having two or more effective antenna apertures.

It should also be understood, that although the present invention will be described for a two dimensional system, it can quite easily be expanded to cover three dimensions.

Figure 2:
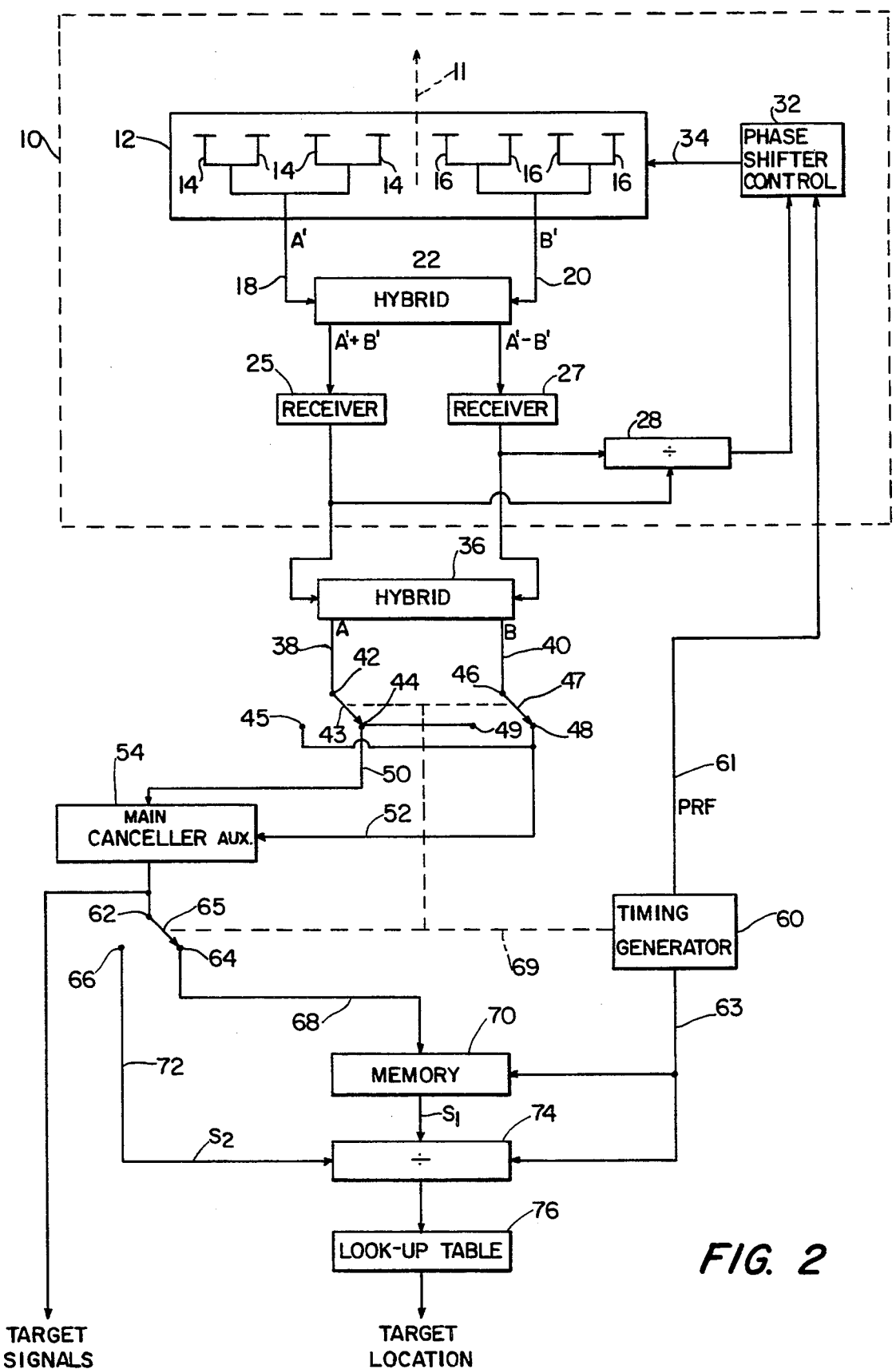
FIG. 2 is a block diagram of a sequential lobing embodiment of the present invention.

Referring now to FIG. 2, a monopulse radar 10 is shown which includes an antenna 12, a hybrid 22, a divider 28, and a phase shifter control 32. The antenna 12 comprises a set of antennas 14 and a set of antennas 16. The responses from the set of antennas 14 are added to yield the signal A' with one phase center, while the responses from the set of antennas 16 are added to yield the signal B' with a different phase center. The signal A' is applied via the line 18 to one input of the hybrid 22, while the signal B' is applied via line 20 to a second input thereof. The hybrid 22 may comprise any of the standard hybrids available in the art which are compatable with monopulse radar systems such as, coaxial hybrids, magic T's, and Rat-Race hybrids.

The hybrid 22 generates a sum signal A'+B' on line 24 and a difference signal A'−B' on line 26. Typically, the sum and difference signals A'+B' and A'−B' are applied to a set of receivers 25 and 27, respectively, to convert the signals to a convenient IF frequency and to amplify the signals. Some form of automatic gain control circuitry is generally included to maintain the gains of the receivers 25 and 27 substantially equal. Various monopulse AGC schemes are available in the art for this purpose. The IF sum and difference signals A'+B' and A'−B' are then applied to the inputs of the divider 28.

The divider 28 divides these two signals (in essence, this process generates the equivalent of the normalized dot product of the signals A' and B') to yield a target location with respect to the boresight axis 11 of the antenna. This location information is then applied to the phase shifter control 32 to shift the effective orientation of the antenna 12 such that its boresight axis 11 is pointing at the target. Such means for effectively changing the orientation of the antenna by applying various phase shifts to the antenna inputs is well known in the art. One system for effecting such orientation changes via phase shifts is disclosed in the book *Introduction to Radar Systems*, by Merrill I. Skolnik, McGraw-Hill Book Company, 1970, Chapter 8, pp. 278, which is hereby incorporated by reference.

In accordance with the present invention, when a jammer is detected in the mainlobe of the monopulse 10, the location of the jammer in one coordinate, for example the elevation coordinate, with respect to the boresight axis of the antenna is determined by dividing the monopulse difference signal A' −B' on the line 26 by the monopulse sum signal A'+B' in the divider 28 (with the radar operating in a passive mode). The output from this divider 28, which is proportional to the jammer location in elevation with respect to the boresight axis 11 of the antenna 12, is then applied to the phase shifter control means 32. The phase shifter control means 32 generates and applies the appropriate phase shifting signals to the antenna 12 to effectively orient the antenna boresight axis 11 to point so that the jammer is positioned within the 3 dB points of the mainlobe of the two effective antenna apertures 14 and 16. Optimally, the boresight axis 11 should point directly at the jammer. However, it is only necessary for the jammer to be located within the mainlobe of the antenna for proper operation of the system.

The sum signals A'+B' and the difference signals A'−B' are also applied to a second hybrid 36 which generates a second set of sum and difference signals, A and B, respectively, where:

$$A=(A'+B')G+(A'-B')G=2A'G$$

$$B=(A'+B')G-(A'-B')G=2B'G.$$

In essence, this second sum and difference operation yields the original set of antenna lobes A' and B' multiplied by a gain factor. This process can be viewed, if we are dealing in the elevation coordinate, as effectively splitting the radar antenna sum beam A'+B' into two parallel beams, (A) and (B). These two beams A and B have different phase centers on a vertical axis.

The A signal is applied via the line 38 and the switch 42 to one input of an adaptive canceller 54. Likewise, the signal B is applied via the line 40 and the switch 46 to a second input of the adaptive canceller 54. The adaptive canceller 54 operates to cancel the signal energy arriving at the angle location of the jammer. Adaptive cancellers of the type employed in coherent sidelobe canceller systems may be conveniently utilized to implement the present invention. In particular, the "Stable Baseband Adaptive Loop" system disclosed in U.S. Pat. No. 3,978,483, by B. L. Lewis and J. P. Hansen, or the "Digital Sidelobe Canceller" disclosed in U.S. Pat. No. 4,086,592 by B. L. Lewis and F. F. Kretschmer, Jr., may be utilized to implement the present adaptive canceller.

In essence the adaptive canceller measures the correlation coefficient K between the main signal, e.g. A, and the auxiliary signal, e.g. B, where $$A=K B$$

and utilizes that correlation coefficient as a weight. The correlation coefficient is measured by summing and averaging z or more successive samples of the correlation coefficient K. Since the jammer signal is generally a continuous wave broadband signal, it is received all of the time over the entire bandwidth of the receiver. Accordingly, the adaptive cancelling weight is almost completely determined by the jamming signal. Short echo pulses from targets have virtually no effect on the cancelling weight due to this summing and averaging process. Thus, the adaptive cancelling loop will not cancel any of the target echos but only the jamming signal.

Typical adaptive cancelling circuits, like the adaptive canceller 54 shown in FIG. 2, have a main and an auxiliary input. The canceller measures the relative magnitude and phase of the auxiliary input signal compared to the main input signal and phase-shifts and either attenuates or amplifies this auxiliary signal and then substracts the result from the main signal such that the output of the canceller is decorrelated from the main input signal. The switch 42 is provided so that the signal A on the line 38 may be applied either to the main input via the line 50 or to the auxiliary input via the line 52. Accordingly, the switch has one position 44 connected directly to the main input of the adaptive canceller via the line 50, and a second position 45 connected directly to the auxiliary input of the adaptive canceller via the line 52. Likewise, the switch 46 is provided so that the signal B on the line 40 may also be applied to either the main or the auxiliary inputs of the adaptive canceller 54. In particular, the position 48 is connected to the auxiliary input via the line 52 and the position 49 is connected to the main input via the line 50. The switches 42 and 46 are ganged such that the switching arms 43 and 47 will connect either to the positions 44 and 48, or to the positions 45 and 49, respectively. Thus, the signals A and B will be applied either to the main and auxiliary inputs of the adaptive canceller, respectively, or vice versa. These ganged switches 42 and 46 are controlled by a timing generator 60 via dashed line 69.

The timing generator 60 is set such that the switching arms 43 and 47 of the switches are connected to the positions 44 and 48, respectively, so that the signal A is applied to the main input while the signal B is applied to the auxiliary input of the adaptive canceller 54 for echo signals received from the first radar pulse after the antenna 12 has been effectively oriented to point so that the jammer is positioned in the mainlobe of the antenna.

At this point in the system, the antenna response with the antenna pointing at the jammer location has been effectively notched i.e., adaptively cancelled. As noted at the beginning of this description, it is desired to obtain the ratio of this notched antenna response to the notched antenna response obtained after the antenna has been effectively shifted in orientation by a small amount. Accordingly, it is necessary to store the adaptively cancelled set of echo signals $S_1$ received with the antenna pointing approximately at the jammer, while the antenna is reoriented and a second radar pulse is transmitted and the echo signals $S_2$ therefrom are adaptively cancelled, i.e. the antenna response is effectively notched. The ratio of the notched or adaptively cancelled echo signals from the same target with the antenna at the two different effective orientations may then be obtained thereby yielding a signal which is porportional to the angle separating that target from the jammer in either azimuth or elevation.

To this end the set of a adaptively cancelled output signals $S_1$ received in response to a radar transmission with the antenna pointing approximately at the jammer is applied from the adaptive canceller 54 thru a switch 62 and the line 68 to a memory 70. The memory 70 may typically be comprised of a shift register, such as for example, a charged coupled device circuit, or a bucket brigade circuit, which may be utilized to store all of the adaptively cancelled echo signals from one range sweep. These adaptively cancelled echo signals from this range sweep may be sequentially clocked into the memory by means of a clocking signal at the Nyquist rate on line 63 from the timing generator 60. The Nyquist rate is, of course, the reciprocal of the bandwidth of the radar at the particular pulse length utilized.

There are a number of circuits available on the market which may be utilized to implement the timing generator 60, for example, Vectron Part #C0238B. Typically, these circuits utilize a common crystal oscillator to provide a high frequency signal and then utilize a series of divider circuits to generate various lower frequency clock and sync signals therefrom.

When all of the echos have returned from this first transmitted pulse with the antenna 12 pointed at the jammer, typically about 1/3000 seconds, the timing generator 60 will generate a signal on line 69, as noted previously, which will cause the switches 42, 46, and 62, to switch to their other positions. Additionally, the timing generator 60 will apply a signal (PRF) via the line 61 to the phase shifter control 32 to cause the antenna orientation to effectively shift in elevation by an arbitrary angle. This angle should be small so that the jammer is still located approximately within the 3 dB points of the new mainlobe orientation. By way of example and not by way of limitation, this arbitrary angle of shift could be 0.3 beamwidths.

After this shift to a new antenna orientation, a second radar pulse is transmitted on the antenna. The echo signals received from the radar transmission at this new antenna position are applied through the two hybrids 22 and 36 in order to generate a second set of IF sum and difference signals A and B on the lines 38 and 40, respectively. However, the timing generator 60 has now switched the switches 42 and 46 to connect to the positions 45 and 59, respectively. Accordingly, the signal A on line 38 is applied through the switch 42 to the auxiliary input of the adaptive canceller 54 via the line 52. Likewise, the signal B on line 40 is applied through the switch 46 to the main input of the adaptive canceller 54 via the line 50.

The timing generator 60 also causes the switching arm 65 to switch via the line 69 to the pole 66 which connects to one input of a divider 74. The other input of the divider is connected to the output of the memory 70. As the adaptively cancelled echo signals $S_2$ from the canceller 54 are applied on the line 72 to one input of the divider 74, the adaptively cancelled echo signals $S_1$ which were stored in the memory 70 are read-out in time coincidence with the second echo signals from the same targets. Accordingly, an adaptively cancelled echo signal $S_1$ from a given target is divided by the adaptively cancelled echo signal $S_2$ from the same target to yield a ratio signal. This ratio signal has been found to be proportional to the elevation angle separating this particular target from the jammer. It should be noted that this ratio operation acts to normalize the target magnitudes. Accordingly, this ratio is not controlled by the range or the size of the target. The divider 74 may be clocked in the same manner as the memory 70 via the line 63 from the timing generator 60.

The ratio signal $S_1/S_2$ may then be applied to a calibration device 76 for calibrating the angle associated with the particular voltage ratio signals. By way of example, this calibration device 76 could be an electronic look-up table or a read-only memory (ROM).

The switching sequence for the switches 42 and 46 is intended to provide the largest jamming signal relative to the auxiliary input to the canceller to provide the best cancellation with the least additive thermal noise.

Figure 1:
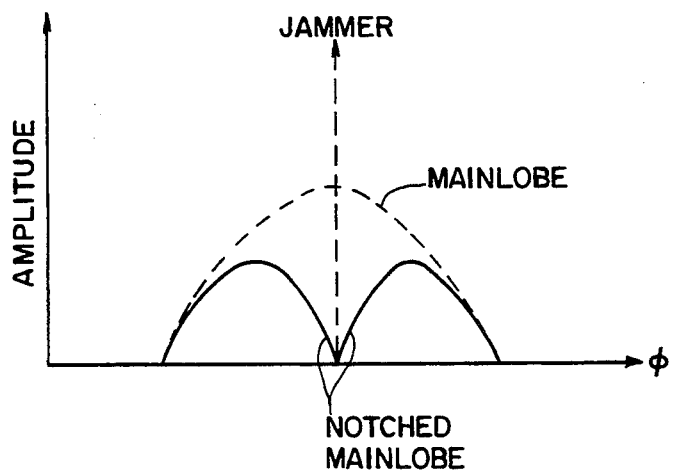
FIG. 1 is a graphical representation of the typical radar antenna response with respect to the arrival angle with mainlobe notching.
Figure 3:
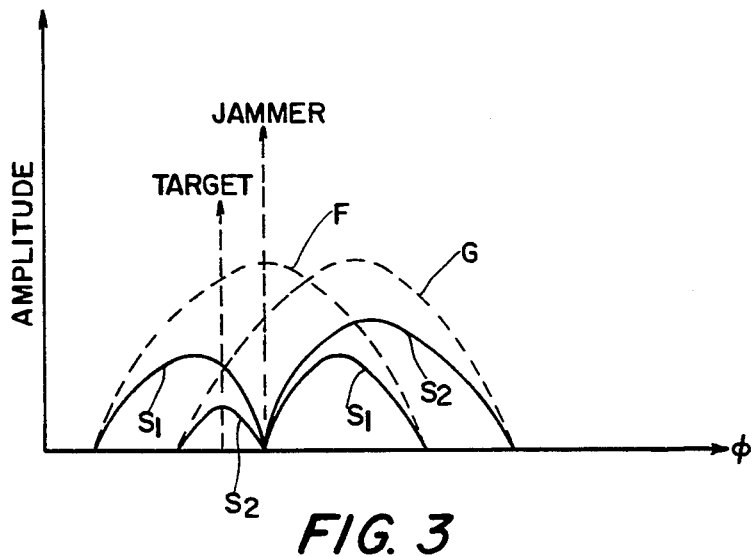
FIG. 3 is a graphical representation of the response of the sequential lobing embodiment of FIG. 2 with respect to the angle of arrival.

FIG. 3 is a graphical representation of the system response with respect to the angle $\phi$. The dashed line curve F represents the antenna patterns A or B in the transmission with the antenna pointed at the jammer. The double hump $S_1$ curve then represents the adaptively cancelled echo signals $S_1$ obtained from a radar transmission with the antenna pointed at the jammer. Likewise, the dashed line curve G represents the antenna patterns A or B in the transmission with the antenna shifted away from the jammer by a small arbitrary angle. The double humped curve $S_2$ then represents the adaptively cancelled echo signals obtained from the radar transmission with the antenna oriented away from the jammer by said small arbitrary angle. The null point for both double humped curves $S_1$ and $S_2$ is, of course, located at the jammer location and is a result of the adaptive cancellation process.

Figure 4:
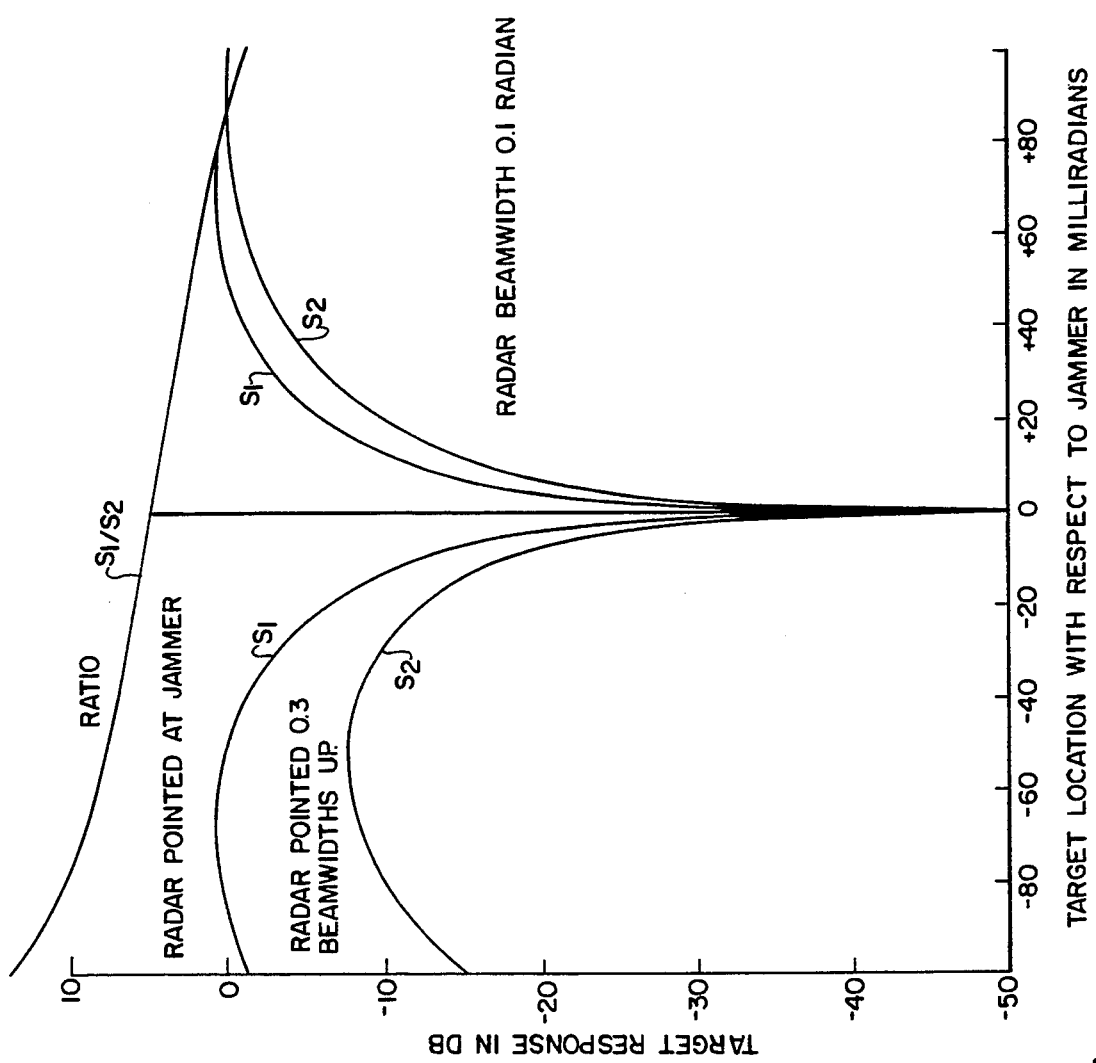
FIG. 4 is a graphical representation of a computer simulation of the target response in dB verses the target location with respect to the jammer for the sequential lobing embodiment of FIG. 2.

The cancellation and division technique of the present embodiment was simulated on a computer with the results illustrated in FIG. 4. In this simulation, beams A and B were taken to approximate the curve (sin x)/x. The double humped curves $S_1$ and $S_2$ along with the ratio $S_1/S_2$ are shown in the figure. It should be noted that the ratio of the response with the jammer in the center of the sum pattern to the response with the jammer 0.3 beamdwidths away from the center sum beam is monotonic and yields unambiguous angle information on targets.

Figure 5:
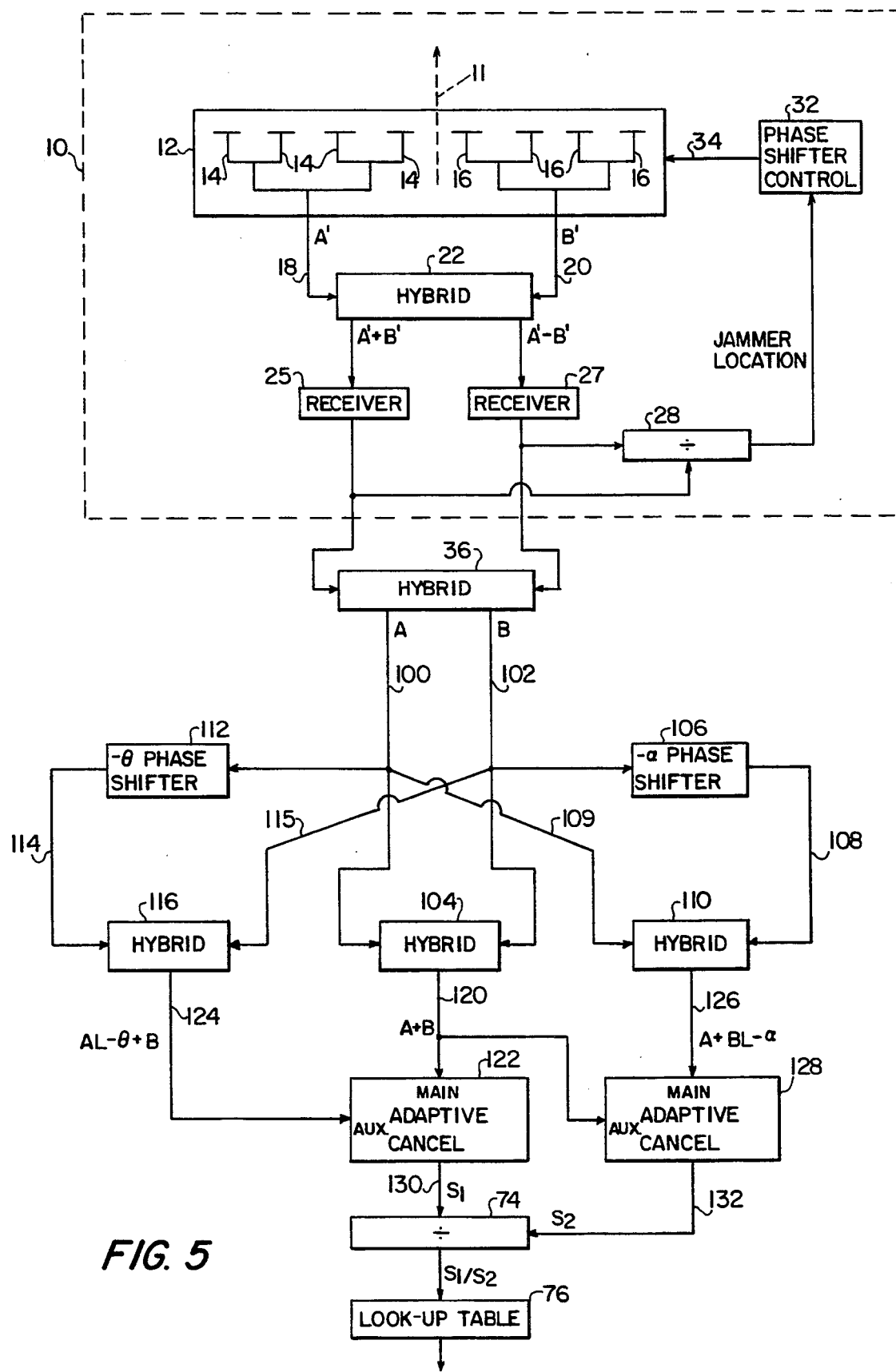
FIG. 5 is a block diagram of a single pulse transmission embodiment of the present invention.

A second embodiment of the present invention is disclosed in FIG. 5. This embodiment permits the generation of adaptively cancelled echo signals $S_1$ and $S_2$ from only a single radar transmission after the radar antenna has been pointed so that jammer is located within the 3 dB points of the mainlobe of the antenna. This single pulse system is accomplished, in essence, by squinting the sum signal for two different angles of arrival and utilizing these two squinted signals and the non-squinted sum signal as inputs to adaptive canceller circuits. The outputs from these adaptive canceller circuits are then the desired $S_1$ and $S_2$ signals. A ratio signal may then be determined and applied sto a look-up table to determine the particular angle between the target and the jammer.

Referring more particularly to the drawing, there is shown a monopulse radar system 10 substantially identical to the system shown in FIG. 2. The same number designations are utilized to label the different blocks in the monopulse radar. In operation, the signal responses from the antenna 14 are added to obtain the A' signal on the line 18. Likewise, signals on the antenna 16 are added to obtain the B' signal on the line 20. The A' and B' signals are again applied to the hybrid 22 which operates to generate the sum and difference signals $A' + B'$ and $A' - B'$. The sum and difference signals are applied to the receivers 25 and 27, respectively, wherein they are converted to a convenient IF frequency and amplified. The amplified IF sum and difference signals are again applied to the divider 28 which determines the location of the jammer in elevation with respect to the boresight axis 11 of the antenna 12. This jammer location signal is again applied to the phase shifter control means 32 which, in turn, applies a control signal on the line 34 to orient the antenna 12 to point so that the jammer is within the 3 dB points of the mainlobe of the antenna, and preferably directly at the jammer. The IF sum and difference signals are again also applied to a second hybrid 36 in order to generate the sum and difference signals A and B on the lines 100 and 102, respectively.

The signals A and B on the lines 100 and 102, respectively, are applied to an adder circuit 104 in order to obtain the sum $A + B$. This adder circuit 104 may conveniently take a form of a hybrid with the difference port terminated with a matched load so that the power applied to the port will not be reflected to cause undesired coupling between the signals.

The signals A and B from the hybrid 36 are also applied to a first squinting circuit composed of a phase shifter 112 and an adder circuit 116 which may conveniently take the form of a hybrid. The signal B is applied via the lines 102 and 115 directly to one input port of the hybrid 116. The signal A is applied via the line 100 to the phase shifter 112 wherein it is shifted in phase by an angle $-\theta$. This phase shift will add a phase lead to the signal A thereby changing the direction from which an incoming electromagnetic wave must arrive in order to obtain a maxmium signal from the addition of the A lobe and B lobe of the antenna. This phaseshifted A signal is then applied via the line 114 to a second input port of the hybrid 116. The sum signal output $A\angle-\theta+B$ is than obtained on the output line 124 for the hybrid 116.

Figure 6:
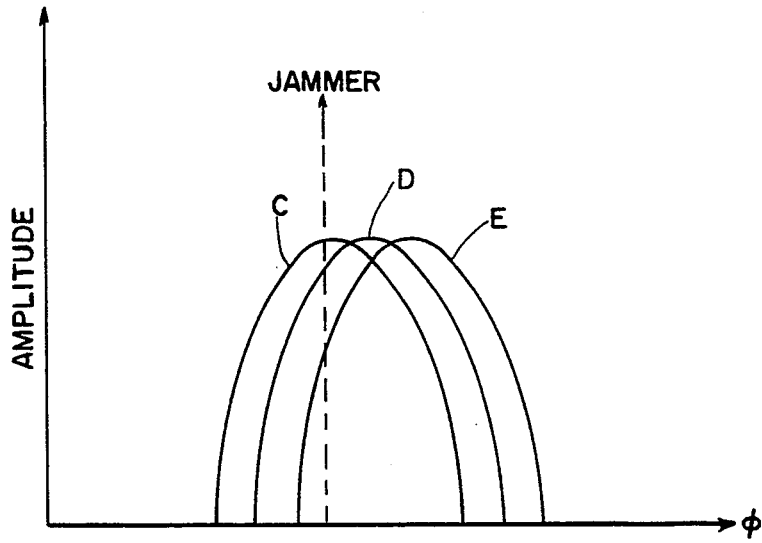
FIG. 6 is a graphical representation of the three antenna patterns obtained from the embodiment disclosed in FIG. 5.

Likewise, the signals A and B are applied to a second squinting circuit comprised of a phase shifter 106 and a hybrid 110. The A signal is applied via the line 102 and 109 directly to one input port of the hybrid 110. The signal B is applied via the line 102 to the phase shifter 106 which operates to add an arbitrary phase $-\alpha$ to the B signal. This phase shifted B signal is then applied via the line 108 to a second input port for the hybrid 110. The sum signal $A+B\angle-\alpha$ is then obtained on the output line 126 from the hybrid 110. Accordingly, the sum beam has been squinted to the right and incoming electromagnetic energy must arrive at an different angle in order to get a maxmium response from this sum signal. Although there is no requirement for identity, for convenience the phase shifting angles $-\theta$ for the signal A and $-\alpha$ for the signal B any be made identical. The two squinted sum beams with their phase shift angles made identical are shown in FIG. 6 along with the unsquinted sum beam. The curve C respresents the output signal $A\angle-\theta+B$ on line 124. The curve E represents the squinted sum signal $A+B\angle-\alpha$ on the line 126 The angular responses of these curves are shown in the figure to be separated by relatively large angles for purposes of illustration. However, in reality, the phase shift angles $-\theta$ and $\theta\alpha$ should be small so that the jammer is still located approximately within the 3 dB points for the squinted sum curves C and E.

The unsquinted sum signal $A+B$ (the D curve) is applied via the line 120 to the main input of an adaptive canceller 122. The squinted signal $A-\theta+B$ on line 124 (the curve C) is applied to the auxiliary input of the adaptive canceller 122. The adaptive canceller 122 operates to decorrelate the input signal curve D at the main input from the input signal curve C at the auxiliary input such that the signal energy coming in at the jammer location is removed. For a jammer location as shown in FIG. 6, the jamming signal in curve D is cancelled by utilizing the attenuated jamming signal in curve C. The output from this adaptive canceller 122 is the signal $S_1$ on the line 130. This signal $S_1$ is applied to one input of the divider 74.

The squinted signal $A+B\angle-\alpha$ on the line 126 (curve E) is applied to the main input of an adaptive canceller 128. The unsquinted sum signal $A+B$ is applied via the line 120 to the auxiliary input of the adaptive canceller 128. Again, the adaptive canceller 128 operrates to decorrelate the jamming signal applied at the main input port of the canceller by means of the signal applied on the auxiliary input port for the canceller. The adaptively cancelled output signal $S_2$ is applied on the line 132 to a second input port of the divider 74. The divider 74 operates to obtain a ratio of these adaptively cancelled signals. By way of example, the adaptively cancelled signals $S_1$ is shown as being divided by the adaptively cancelled signal $S_2$. The ratio signal $S_1/S_2$ is than applied to a calibrating circuit such as a look-up table or a ROM 76 to convert the ratio signal to a specific angle value. It is, of course, understood that the signals applied to the main and auxiliary inputs of the adaptive canceller 122 could be switched, as could the main and auxiliary inputs to the adaptive canceller 128, without changing the system operation. Such a change would require the values in the look-up table 76 to be appropriately altered, though.

As noted previously for the first embodiment, this invention is not restricted to a monopulse radar system per se, but may be utilized with any system having two or more effective antenna apertures. Accordingly, the signals A and B could be obtained directly from the lines 18 and 20 in the embodiment shown in FIGS. 2 and 5 without need for processing through the pair of hybrids 22 and 36. The first hybrid 22 is merely the standard sum and difference signal hybrid utilized in monopulse radar systems. The second hybrid 36 is utilized in both systems to reconvert the sum and different signals $A'+B'$ and $A'-B'$ back to the lobes A and B.

It should be understood, of course, that the signals on lines 18 and 20 in FIGS. 2 and 5 are not orthogonal. Thus, the two-way spliting in FIG. 2 and the three-way spliting in FIG. 5 will essentially split the signal power which will, in turn, degrade the signal-to-noise ratio of the system. This power reduction is especially critical in the three-way split in FIG. 5 and will cause the power to be down by approximately 5 dB. Accordingly, some form of amplification in the lines 18 and 20 will be required if the signals therein are to be applied directly to the adaptive cancellers.

FIG. 5 essentially gives you two looks at the volume from different angles via the squinting. Thus, the basis for the systems disclosed in FIG. 2 and FIG. 5 are very similar. However, it should be noted that FIG. 5 utilizes the response across both antenna apertures, i.e. the sum signals, in order to develop the various auxiliary and main inputs to the adaptive cancelling circuits 122 and 128. Thus, the signals applied to the adaptive cancellers in this figure will have a higher amplitude than the signals applied to the adaptive canceller in FIG. 2.

The output response for FIG. 5 can be visualized by utilizing FIG. 3. More speccifically, the curves labeled A and B can be relabeled D and E, respectively, in order to represent the response of FIG. 5. The adaptively cancelled output signals $S_1$ and $S_2$ shown in FIG. 3 are the same for FIG. 5. It should be noted of course, that the curves D and E represents the sum signal responses $A+B$ and $A+B\angle-\alpha$. The squinted sum signal curve C is utilized as the auxiliary input for cancelling the main input signal in the adaptive canceller 122, and thus need not be shown in the figure. It can be seen that for the specific target location shown in FIG. 3, the ratio of $S_1$ and $S_1$ will yield a specific value which can be translated into an angle separation between the jammer and the target.

It should be noted that the signal pulse processing system disclosed in FIG. 5 has an advantage over the sequential lobing system disclosed in FIG. 2 in that the single pulse system will not decorrelate on a pulse-to-pulse basis. Thus, the response of the circuit embodiment disclosed in FIG. 5 will not depend on the rolling, pitching, or yawing of the target.

It should also be understood that the above-disclosed adaptive cancellation and ratio-taking process can be accomplished digitally merely by converting both the A signal and the B signal to I and Q signals and then converting these two I signals and the two Q signals to a stream of digital words by means of Analog/Digital converters sampling at the Nyquist rate. All subsequent circuitry after this conversion may then be digital in format.

The present invention has been disclosed in the context of a two dimensional system for convenience. However, it is understood that most radar systems are three dimensional, and that an equivalent system can be set up for the aximuth dimension.

Accordingly, the embodiments shown herein disclose an invention which obtains target angle measurements by taking the ratios of the adaptively cancelled echos obtained from different beam-pointing angles. Such a system has the advantage over the prior art in that it permits the detection of targets in the complete mainlobe of the radar except at the jammer location and it provides a measure of the target location with respect to the jammer which can be transformed to an absolute location via the measurement of the jammer location. This invention may be utilized with any system having two effective antenna aperatures, and is especially suited for use with monopulse radar systems.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for cancelling signals from a jammer entering the mainlobe of the antenna of a monopulse radar and for providing target locations with respect to the location of the jammer comprising:
    means for notching the antenna response at the jammer location with the antenna pointing so that the jammer is positioned within the 3 dB points of the mainlobe of the antenna;
    means for shifting the effective orientation of said antenna by a small amount and notching the antenna response at the jammer location at the new effective orientation, said new orientation being such that the jammer is still located approximately within the 3 dB points of the new mainlobe orientation; and
    means for determining the ratio between echo signals from the same targets in these two notched antenna responses, said ratio being proportional to the angle separating the target in the response from the jammer.

2. A method for cancelling signals from a jammer entering the mainlobe of the antenna of a monopulse radar and for providing target locations with respect to the location of the jammer comprising the steps of:
    notching the antenna response at the jammer location with the antenna pointing so that the jammer is positioned within the 3 dB points of the mainlobe of the antenna;
    shifting the effective orientation of the antenna and notching the antenna response of the jammer location at this new effective orientation, said new orientation being such that the jammer is still located approximately within the 3 dB points of the new mainlobe orientation; and
    determining the ratio between any echo signals from the same targets in these two notched antenna responses; said ratio being proportional to the angle separating the target in the response from the jammer.

3. A method for cancelling signals from a jammer entering the mainlobe of the antenna of a monopulse radar and for providing target locations with respect to the location of the jammer comprising the steps of:
    receiving a first set of echo and jamming signals and determining the position of the jammer therefrom;
    effectively orienting the boresight axis of said monopulse radar antenna to point so that the jammer is positioned within the 3 dB points of the antenna mainlobe;
    receiving a second set of echo and jamming signals reflected from the next radar transmission after said orienting step;
    adaptively cancelling the jammer signal from the second set of received echo and jamming signals;
    storing this second set of adaptively cancelled echo signals in time sequential order;
    effectively changing the orientation of the boresight axis of said monopulse radar antenna by a small arbitrary angle $\theta$ such that the jammer is still located approximately within the 3 dB points of the new mainlobe orientation of the antenna;
    receiving a third set of echo and jamming signals reflected from the next radar transmission after said orientation changing step;
    adaptively cancelling the jamming signals from this third set of received echo and jamming signals;
    reading-out said second set of stored adaptively cancelled echo signals in time coincidence with the occurrence of the adaptively cancelled echo signals in said third set reflected from the same targets; and
    dividing the adaptively cancelled echo signals in one of the second or third sets, e.g., the second set, by the time coincident adaptively cancelled echo signals in the other of the second or third sets, e.g., the third set, to obtain a set of ratio signals which are proportional to the angles separating the individual targets from the jammer.

4. A method as defined in claim 3, further comprising the step of converting the ratio signal generated in said dividing step to an angle value.

5. A method as defined in claim 4, wherein said monopulse radar has two effective antenna apertures which provide signal pairs and wherein said first set receiving step includes the steps of
    generating a first set of sum and difference signals from the signal pairs from said two effective apertures; and
    utilizing said first set of sum and difference signals to determine the location of said jammer;
and wherein said second set receiving step includes the steps of:
    generating a second set of sum and difference signals from the second set of signal pairs from said two effective apertures; and
    generating a third set of sum and difference signals from said second set of sum and difference signals; and wherein said third set receiving step includes the steps of:
    generating a fourth set of sum and difference signals from the third set of signal pairs from said two effective apertures; and
    generating a fifth set of sum and difference signals from said fourth set of sum and difference signals.

6. A method as defined in claim 5, wherein the first adaptive cancelling step comprises the step of applying the third set of sum signals as the main signal and the third set of difference signals as the auxiliary signal in an adaptive cancellation process; and
    wherein the second adaptive cancelling step comprises the step of applying the fifth set of sum signals as the auxiliary signal and the fifth set of difference signals as the main signal in an adaptive cancellation process.

7. A method for cancelling jammer signals entering the mainlobe of a monopulse radar having two effective antenna apertures, and for providing target locations with respect to the location of the jammer comprising the steps of:

receiving a first set of echo signal pairs from a first radar transmission along with jamming signals from said two effective antenna apertures;

generating a first set of sum and difference signals from said first set of signal pairs;

determining the angular position of the jammer with respect to the boresight axis of the two effective antenna apertures utilizing said first set of sum and difference signals;

orienting the boresight axis of the two effective antenna apertures to point so that the jammer is positioned within the 3 dB points of the mainlobe of said two effective antenna apertures;

receiving a second set of echo signal pairs from a second radar transmission along with jamming signals from said two effective antenna apertures after said orienting step;

generating a second set of sum and difference signals from said second set of received echo signal pairs;

generating a third set of sum and difference signals from said second set of sum and difference signals;

adaptively cancelling the jamming signal by utilizing either the third set of sum or the third set of difference signals as the main signal, e.g., the third set of sum signals, and the other set, e.g., the third set of difference signals, as the auxiliary signal in an adaptive cancelling process;

storing this adaptively cancelled set of echo signals in time sequence;

changing the orientation of the boresight axis of the two effective antenna apertures by an arbitrary angle such that the jammer is still located approximately within the 3 dB points of the new mainlobe orientation of the antenna;

receiving a third set of echo signal pairs from a third radar transmission along with jamming signals from said two effective antenna apertures;

generating a fourth set of sum and difference signals from said third set of each signal pairs;

generating fifth set of sum and difference signals from said fourth set of sum and difference signals;

adaptively cancelling the jamming signal by utilizing the fifth set of sum and the fifth difference signals in an order reversed from that used in the first adaptive cancelling step process, e.g., with the fifth set of sum signals utilized as the auxiliary signal and the fifth set of difference signals utilized as the main signal in an adaptive cancelling process;

reading-out the adaptively cancelled stored echo signals from said second radar transmission in time coincidence with the occurrence of the adaptively cancelled echo signals reflected from the same targets from said third radar transmission;

dividing the sequentially read-out adaptively cancelled echo signals from said second radar transmission by the adaptively cancelled echo signals from said third radar transmission to obtain a ratio signal which is proportional to the elevation angle separating the target from the jammer; and applying this ratio signal to a look-up table to determine the target location with respect to the jammer.

8. A system for cancelling jammer signals in the mainlobe of a monopulse radar and providing target locations with respect to the location of the jammer comprising:

a monopulse radar including an antenna with two effective apertures and a boresight axis for receiving echo signals from a radar transmission at each effective aperture along with jamming signals and generating signals A' and B' therefrom;

means for converting said received echo signals A' and B' into sum and difference signals;

means for determining the angular position of the jammer with respect to the boresight axis of said monopulse radar antenna by utilizing said sum and difference signals and then effectively orienting said boresight axis to point so that said jammer is positioned within the 3 dB points of the mainlobe of said two effective antenna apertures;

adaptive canceller means with main and auxiliary inputs;

a memory means for amplifying the received echo signals A' and B' from said two effective antenna apertures prior to conversion to sum and difference signals and applying these amplified signals to the main and auxiliary inputs of said adaptive canceller means, e.g., the A' echo signal to the main input and the B' echo signal to the auxiliary input, such that the jamming signal is cancelled from the output of said adaptive canceller means;

wherein said adaptive canceller means cancels the jamming signal from a first set of echo signals received from the next radar transmission after said monopulse antenna axis has been effectively pointed so that the jammer is within the 3 dB points of the antenna mainlobe and applies this adaptively cancelled first set of echo signals in time sequence to said memory;

means for changing the effective orientation of the boresight axis of said monopulse radar antenna by an arbitrary angle, such that the jammer is still located approximately within the 3 dB points of the new mainlobe orientation of the antenna;

first switching means for reversing the application of the amplified echo signals A' and B' to said adaptive canceller means for the next radar transmission after the effective orientation of said monopulse antenna axis has been changed by said arbitrary angle, e.g., B' to said main input and A' to said auxiliary input;

wherein said adaptive canceller means then cancels the jamming signal from a second set of echo signals received from the next radar transmission after the effective orientation of said monopulse antenna axis has been changed by said arbitrary angle;

divider means with one input port connected to the output of said memory;

second switching means for switching the adaptive canceller means echo signal output from said memory to a second input port of said divider means such that said second set of echo signals are applied thereto;

wherein said first set of adaptively cancelled stored echo signals in said memory are read-out to said divider means in time coincidence with the occurrence of adaptively cancelled echos in said second set reflected from the same targets such that a ratio signal is obtained for each target which is proportional to the angle separating the target from the jammer position.

9. A system for cancelling jammer signals in the mainlobe of a monopulse radar and providing target locations with respect to the location of the jammer comprising:

a monopulse radar including an antenna with two effective apertures and a boresight axis for receiving echo signals from a radar transmission at each effective aperture along with jamming signals and generating signals A' and B' therefrom;

first means for converting said received echo signals A' and B' into a first set of sum and difference signals $A'+B'$ and $A'-B'$;

means for determining the angular position of the jammer with respect to the boresight axis of said monopulse radar antenna by utilizing said first set of sum and difference signals and then effectively orienting said boresight axis to point so that the jammer is positioned within the 3 dB points of the mainlobe of said two effective antenna apertures;

adaptive canceller means with main and auxiliary inputs;

second means for converting said first set of sum and difference signals into a second set of sum and difference signals $G_1A'$ and $G_2B'$, where $G_1$ and $G_2$ are constants, and applying the signals $G_1A'$ and $G_2B'$, in either order, to the main and auxiliary inputs of said adaptive canceller means, e.g., the $G_1A'$ signal to the main input and the $G_2B'$ signal to the auxiliary input, such that the jamming signal is cancelled at the output of said adaptive canceller means;

wherein said adaptive canceller means cancels the jamming signal from a first set of echo signals received from the next radar transmission after said monopulse antenna boresight axis has been pointed so that the jammer is positioned within the 3 dB points of the antenna mainlobe and applies this adaptively cancelled first set of echo signals in time sequence to said memory;

means for changing the effective orientation of the boresight axis of said monopulse radar antenna by an arbitrary angle such that the jammer is still located approximately within the 3 dB points of the new mainlobe orientation of the antenna;

first switching means for reversing the application of the echo signals $G_1A'$ and $G_2B'$ to said adaptive canceller means for the next radar transmission after the effective orientation of said monopulse antenna axis has been changed by said arbitrary angle, e.g., $G_2B'$ to said main input and $G_1A'$ to said auxiliary input;

wherein said adaptive canceller means then cancels the jamming signal from a second set of echo signals received from the next radar transmission after the effective orientation of said monopulse antenna axis has been changed by said arbitrary angle;

divider means with one input port connected to the output of said memory;

second switching means for switching the adaptive canceller means echo signal output from said memory to a second input port of said divider means such that said second set of echo signals are applied thereto;

wherein said first set of adaptively cancelled stored echo signals in said memory are read-out to said divider means in time coincidence with the occurrence of adaptively canceled echos in said second set reflected from the same targets such that a ratio signal is obtained for each target which is proportional to the angle separating the target from the jammer position.

10. A system as defined in claim 9, further including means for converting said ratio signal to an angle value.

11. A system as defined in claim 10, wherein said first and second sum and difference converting means are hybrids.

12. A system for cancelling jammer signals in the mainlobe of a monopulse radar and providing target locations with respect to the location of the jammer comprising:

a monopulse radar including an antenna for receiving echo signals from a radar transmission along with jamming signals and generating a first set of sum and difference signals therefrom;

means for determining the angular position of the jammer generating said jamming signals with respect to the boresight axis of said monopulse radar antenna by utilizing said sum and difference signals and then effectively orienting said antenna boresight axis to point so that the jammer is positioned within the 3 dB points of the antenna mainlobe;

means for generating a second set of sum and difference signals from said first set of sum and difference signals;

first adaptive cancelling means with main and auxiliary inputs;

second adaptive cancelling means with main and auxiliary inputs;

means for shifting the phase of said second sum signal;

means for shifting the phase of said second difference signal;

first means for adding said second sum signal to said second difference signal and applying this sum to the main input of said first adaptive canceller means and to said auxiliary input of said second adaptive canceller means;

second means for adding said phase shifted second sum signal to said second difference signal to obtain a squinted signal and applying this sum to the auxiliary input of said first adaptive canceller means;

third means for adding said second sum signal to said phase shifted second difference signal to obtain a squinted signal and applying this sum to the main input of said second adaptive cancelling means; and means for dividing the output signal from one of said adaptive canceller means by the output from the other of said adaptive canceller means in order to obtain a ratio signal which is proportional to the angle separating the target echo from the jammer position.

13. A system as defined in claim 12, further including means connected to the output said dividing means for converting said ratio signal therefrom to an angle value.

14. A system as defined in claim 13, wherein said means for generating a sum and difference signal and said first, second, and third adding means are hybrids.

15. A system as defined in claim 14, wherein said second sum phase shifting means and said second difference phase shifting means shift the phase of their respective input signals only slightly in order to insure that the jammer will be positioned approximately within the 3 dB points of the resulting squinted mainlobes of said monopulse antenna.

16. A system for cancelling jammer signals in the mainlobe of a monopulse radar and providing target locations with respect to the location of the jammer comprising:
- a monopulse radar including an antenna with two effective apertures for receiving echo signals from a radar transmission along with jamming signals;
- means for determining the location of said jammer;
- means for effectively pointing the boresight axis of said monopulse antenna so that the jammer is positioned within the 3 dB points of the mainlobe of said two effective antenna apertures;
- first means for squinting the echo signals received from the two effective apertures of said monopulse antenna for a first angle of arrival;
- first means for adding the echo signals from each of said two effective antenna apertures;
- second means for squinting said echo signals from said two effective apertures of said monopulse antenna for a second angle of arrival;
- first adaptive cancelling means for cancelling the jamming signal from the received echo signals by utilizing the output signals from said first adding means and said first squinting means in an adaptive cancelling process;
- second adaptive cancelling means for cancelling the jamming signal from the received echo signals by utilizing the outputs from said adding means and said second squinting means in an adaptive cancelling process; and
- means for taking the ratio of the output signals from one of said adaptive cancelling means with respect to the output signals from the other adaptive cancelling means, said ratio signals being proportional to the angles separating the individual targets from the jammer.

17. A system as defined in claim 16, wherein said first and second squinting means squint the monopulse antenna mainlobe only slightly so that the jammer is still located approximately within the 3 dB points of the resulting squinted antenna mainlobes.

18. A system as defined in claim 17, further comprising means connected to said ratio taking means for converting said ratio signals therefrom to an angle value.

19. A system as defined in claim 18, wherein said monopulse radar includes:
- first means for generating first sum and difference signals from the signals received from the two effective antenna apertures;
- means for amplifying said sum and difference signals and applying said sum and difference signals to said location determining means; and
- second means for generating second sum and difference signals from said first sum and difference signals.

20. A system as defined in claim 19, wherein said first squinting means comprises:
- first means for phase shifting said second sum signal; and
- second adding means for adding said phase shifted second sum signal to said second difference signal; wherein said second squinting means comprises:
- second means for phase shifting said second difference signal; and
- third adding means for adding said phase shifted second difference signal to said second sum signal; and wherein said first adding means adds said second sum and difference signals together.

21. A system as defined in claim 20, wherein said first and second sum and difference generating means and said first, second, and third adding means are hybrids.

22. A system as defined in claim 21, wherein said adaptive canceller means have main and auxiliary input ports and wherein the output signal from said first adding means is applied to the main input port and the output signal from said second adding means is applied to the auxiliary input port of said first adaptive cancelling means, and wherein the output signal from said first adding means is applied to the auxiliary input port and the output signal from said third adding means is applied to said main input port of said second adaptive cancelling means.

23. A method for cancelling jammer signals in the mainlobe of a monopulse radar which includes an antenna with two effective apertures and for providing target locations with respect to the location of the jammer comprising the steps of:
- receiving a first set of echo signals from a radar transmission along with jamming signals;
- determining the location of the jammer from said first set of echo and jamming signals;
- effectively orienting the antenna of said monopulse radar to point so that the jammer is positioned within the 3 dB points of the mainlobe of said two effective antenna apertures;
- squinting the echo signals received from the two effective apertures of said monopulse antenna for a first angle of arrival;
- and simultaneously adding the echo signals received from the two effective apertures of said monopulse antenna;
- and simultaneously squinting the said echo signals received from the two effective apertures of said monopulse antenna for a second angle of arrival;
- adaptively cancelling the jamming signal from the received echo signals by utilizing the output signals from said first squinting step and from said adding step in an adaptive cancelling process;
- simultaneously adaptively cancelling the jamming signal from the received echo signals by utilizing the output signals from said adding step and said second squinting step in an adaptive cancelling process; and
- dividing the output signals from one adaptive cancelling step by the output signals from the other adaptive cancelling step to obtain ratio signals which are proportional to the angles separating the individual targets from the jammer.

24. A method as defined in claim 23, wherein said squinting steps squint the monopulse mainlobe only slightly so that the jammer is still located approximately within the 3 dB points of the resulting squinted antenna mainlobes.

25. A method as defined in claim 24, further comprising the step of converting said ratio signals to angle value.

26. A method as defined in claim 25, wherein said receiving step includes the steps of:
- generating a first set of sum and difference signals from the signals received from said two effective antenna apertures;
- amplifying said first sum and difference signals for utilization in said location determining step; and also generating a second set of sum and difference signals from the amplified first set of sum and difference signals.

27. A method as defined in claim 26, wherein said first angle squinting step includes the steps of:
shifting the phase of the second set of sum signals to obtain said first angle of arrival; and
adding said phase shifted second set of sum signals to said second set of difference signals to yield a fourth set of signals; and wherein said first adding step comprises the step of adding said second set of sum signals to said second set of difference signals to yield a fifth set of signals; and wherein said second angle squinting step comprises the steps of:
shifting the phase of the second set of difference signals to obtain said second angle of arrival; and
adding said phase shifted second set of difference signals to said second set of sum signals to yield a sixth set of signals.

28. A method as defined in claim 27, wherein said first adaptive cancelling step comprises the step of utilizing said fifth set of signals from said first adding step as a main input signal and utilizing said fourth set of signals from said first angle squinting step as the auxiliary input signal in an adaptive cancelling process; and
wherein said second adaptive cancelling step comprises the step of utilizing said fifth set of signals from said first adding step as an auxiliary input signal and said sixth set of signals from said second angle squinting step as the main input signal in an adaptive cancelling process.

* * * * *